Patented Dec. 26, 1939

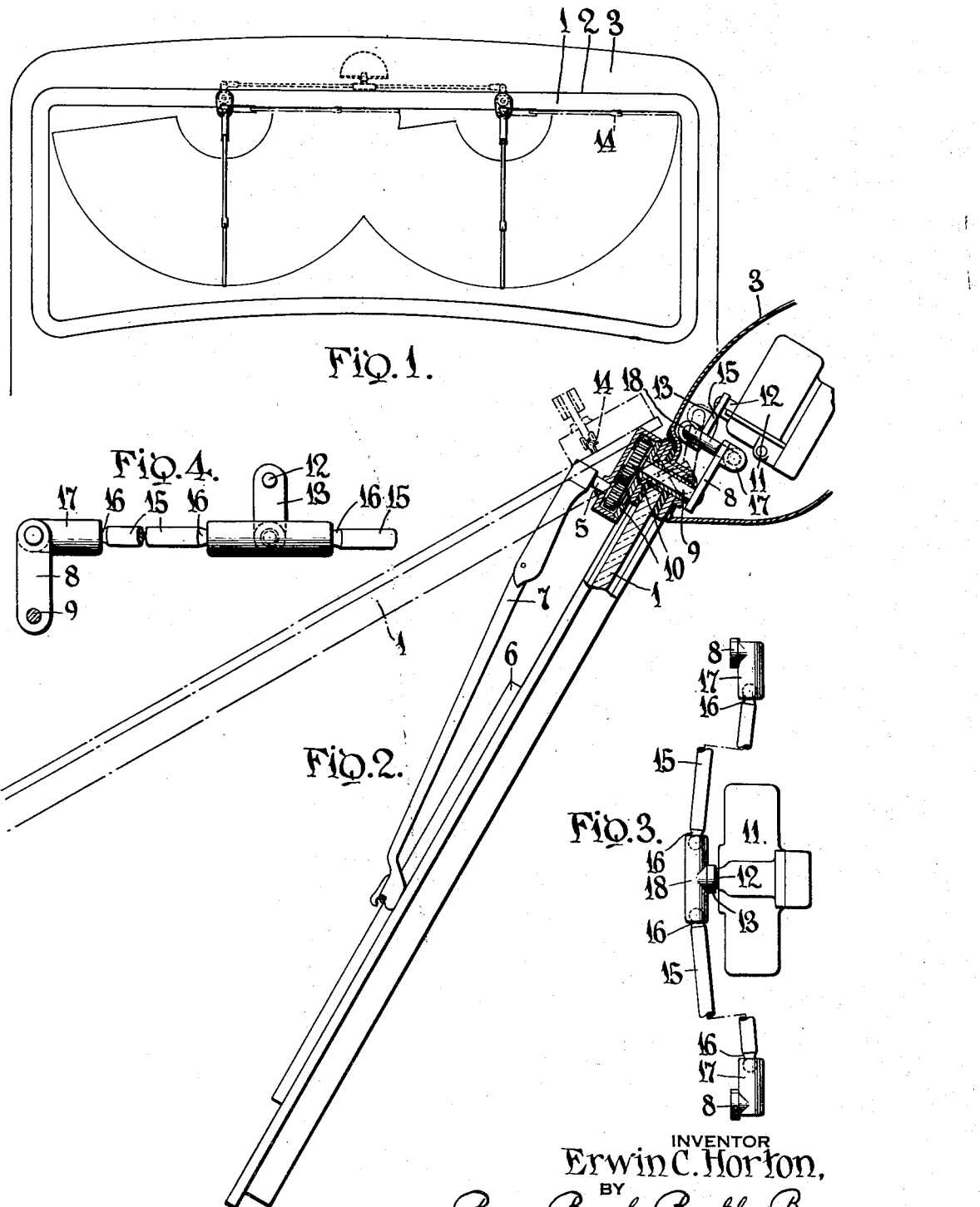

2,184,700

UNITED STATES PATENT OFFICE 2,184,700

WINDSHIELD CLEANER

Erwin C. Horton, Hamburg, N. Y., assignor to Trico Products Corporation, Buffalo, N. Y.

Application July 7, 1936, Serial No. 89,386

6 Claims. (Cl. 15—255)

This invention relates to a windshield cleaner and particularly to that type of cleaner wherein the driving or power shaft and the wiper actuating shaft are mounted on separate parts of a vehicle or are disposed in spaced relation to each other.

The present day automobile is provided with a windshield which is adjustable to an open position, as by swinging the lower edge forwardly. In mounting the windshield cleaner it has heretofore been the practice to mount it entirely on the header or top frame structure above the windshield so as not to interfere with the opening of the windshield for ventilating purposes. Where plural windshield wipers have been used, it has been the custom either to provide individual motors on the header frame and have the wipers respectively connected directly to their motor shaft, or to have a single motor drive the two wipers, each wiper having an actuating shaft connected to the motor by a pair of links or similar connections. Such arrangement has served not only to synchronize the wipers in their movements, but to facilitate the installation as well as render the same economical in production. While this construction has been practical, it has disposed the wiper shaft too high up and thereby limited the sweep of the wiper and the area cleaned by the latter.

The present invention has for its object to provide a windshield cleaner especially adapted for the swinging type of windshield adjustment, which will function in an efficient manner for cleaning a larger area on the windshield glass. Further, it is an object of the invention to provide a windshield cleaner construction wherein the wiper is mounted on the windshield in a manner to permit freedom of adjustment of the windshield, while at all times retaining the driving relation between the wiper and its source of power.

In the drawing

Fig. 1 is a front elevation of a motor vehicle windshield showing the present invention applied thereto;

Fig. 2 is a vertical sectional view, partly in elevation, more clearly depicting the improved windshield cleaner construction;

Fig. 3 is a fragmentary plan view of such construction showing particularly the power transmission between the motor and the wiper; and Fig. 4 is a fragmentary front elevation of the windshield cleaner transmission.

Referring more particularly to the drawing, the numeral 1 designates the windshield which is hingedly connected at 2 along its upper edge to the header construction 3 for permitting the windshield being angularly adjusted from the full line position in Fig. 2 as to the broken line position thereof for purposes of ventilating the passenger compartment of the vehicle.

Mounted on the windshield frame at the upper marginal portion thereof is a wiper actuating shaft 5 to which the wiper 6 is connected by the carrying arm 7 for oscillatory movement over the windshield glass. The wiper actuating shaft is provided with a crank arm 8 which may be connected directly thereto or, as shown, where it is desired to drop the axis of wiper oscillation closer to the glass, the crank arm may be connected indirectly thereto as through an intermediate shaft 9 and the intermeshing gears 10, which latter connect the two shafts. The motor 11 or other source of power is shown as being concealed within the header 3 of the vehicle where it is given firm support on the body frame. The motor 11 is provided with a power shaft 12 and on this shaft is fixed a crank arm 13 for driving connection to the driven crank arm 8 of the wiper actuating shaft.

When the windshield is in its closed or normal position the two crank arms will operate in substantially the same plane or in parallel planes, but it is obvious that when the windshield is opened by being swung forwardly the driven crank arm 8 will be angularly and bodily displaced from its normal plane of operation, as well as with respect to the plane of the driving crank arm. According to one phase of this invention, means are provided for connecting the two crank arms in a permanent though flexible manner, by which the wiper connection with its drive is constantly maintained and, further, the wiper will be retained in its normally parked or inoperative position indicated at 14. Such flexible connecting means is illustrated as comprising a push-pull link 15 which is joined at its opposite ends by a play joint 16 that permits limited universal movement between the connected parts, and for this reason the joints may be in the form of a ball and socket union, the opposite ends of the link being shaped in the form of a ball to fit in a socket formed in the coupling members 17 and 18. The coupling member 17 is pivotally connected to the crank arm 8, whereas the coupling member 18 is pivoted to the driving crank arm 13.

This construction provides a push-pull connection between the two crank arms which permits bodily movement of the driven crank arm, as the windshield is adjusted, in a plane at right angles to its normal path of operation for maintaining the driving connection between the wiper and the motor, whether the cleaner is operating or at rest. Thus in the broken line showing of Fig. 2, with the windshield adjusted to open position, the crank arm 8 has bodily swung about the hinge mounting of the windshield from the solid line position, although this is untrue of the two positions of the connecting link 15, which is depicted in solid line as being in its operative position midway between the ends of its stroke, while the broken line position is in its wiper parking position, in which parked position the coupling member 18 will be disposed at its highest point in its path of travel.

In Fig. 1 two wipers have been illustrated for providing an increased field of vision, and to accommodate such arrangement the coupling member 18 will be extended in the opposite direction to provide for the ball and socket or the universal joint 16 of the companion link 15.

It is thus obvious from the foregoing that the wiper, when parked, will remain substantially in such position, whether the windshield is open or closed, and when the wiper is operating, its operation will not be interrupted, during adjustment of the windshield, by reason of the constantly maintained connection between the wiper and its remotely disposed drive.

While the foregoing description has been given in detail for a clear understanding of the disclosure, it is not the intention to restrict the invention thereby, since the inventive principles herein involved are readily applicable to other physical embodiments without departing from the spirit or scope of the inventive teaching.

What is claimed is:

1. The combination with a swingingly adjustable windshield of a motor vehicle, of a wiper pivotally mounted on the windshield and provided with an actuating crank arm, a drive shaft mounted on the adjacent portion of the vehicle to which the windshield is pivoted and provided with a crank arm, and a push-pull member connected to each of the two crank arms by play joints permitting the opening of the windshield and still maintaining operative relation with both crank arms.

2. The combination with a motor vehicle having a header and a windshield hinged along its upper edge thereto for swinging adjustment, of a wiper, a wiper actuating shaft journalled on the windshield and provided with a crank arm in the header, a drive shaft mounted within the header and provided with a crank arm thereon, and a power transmitting member connecting the two crank arms within the header by universal joints, for maintaining the driving connection during adjustment of the windshield.

3. A windshield cleaner for swingingly adjustable windshields, comprising a drive shaft mounted on a fixed part of a motor vehicle to which the windshield is hinged and having a crank arm, a wiper, an actuating shaft for the wiper connected thereto and journaled on the windshield, a crank arm connected to the wiper actuating shaft and disposed to one side of the plane of operation of the driving crank arm, and a connection between the two crank arms embodying a push-pull member having a play joint at each end permitting of angular displacement of one crank arm relative to the plane of operation of the companion crank arm during adjustment of the windshield.

4. The combination with a swingingly adjustable windshield of a motor vehicle, of a wiper pivotally mounted on the windshield and provided with an actuating crank arm, a drive shaft mounted on the adjacent portion of the vehicle to which the windshield is pivoted and provided with a crank arm, and a push-pull connection between both crank arms, said connection including a link having a ball and socket joint at each end to permit of relative angular displacement between the crank arms during swinging adjustment of the windshield, one of the crank arms being mounted to operate at the beginning of each wiper stroke in a downward arc and the other crank arm being mounted to operate in an upward arc concurrently therewith.

5. The combination with a swingingly adjustable windshield of a motor vehicle, of a wiper pivotally mounted on the windshield and provided with an actuating crank arm, a drive shaft mounted on the adjacent portion of the vehicle to which the windshield is pivoted and provided with a crank arm, and a push-pull connection between both crank arms, said connection including a link having a ball and socket joint at each end to permit of relative angular displacement between the crank arms during swinging adjustment of the windshield, the ball part of each joint and the associated socket part having their axes substantially in alignment with the transmitted line of force between the crank arms.

6. The combination with a swingingly adjustable windshield of a motor vehicle of cleaner means therefor comprising a drive shaft mounted on a fixed part of the vehicle and having crank means, spaced wipers on opposite sides of the drive shaft, an actuating shaft for each wiper journaled on the windshield at opposite sides of the drive shaft, a crank means connected to each actuating shaft, a link for each actuating shaft connected to the crank means thereof by a play joint, the opposite ends of the links extending toward the drive shaft, and a single coupling member connected to said opposite ends of the links by play joints, said coupling member being pivotally connected to the crank means on said drive shaft for being driven thereby.

ERWIN C. HORTON.